A. S. BEYMER.
CULTIVATOR.
APPLICATION FILED SEPT. 4, 1917.
1,276,017.
Patented Aug. 20, 1918.
2 SHEETS—SHEET 1.
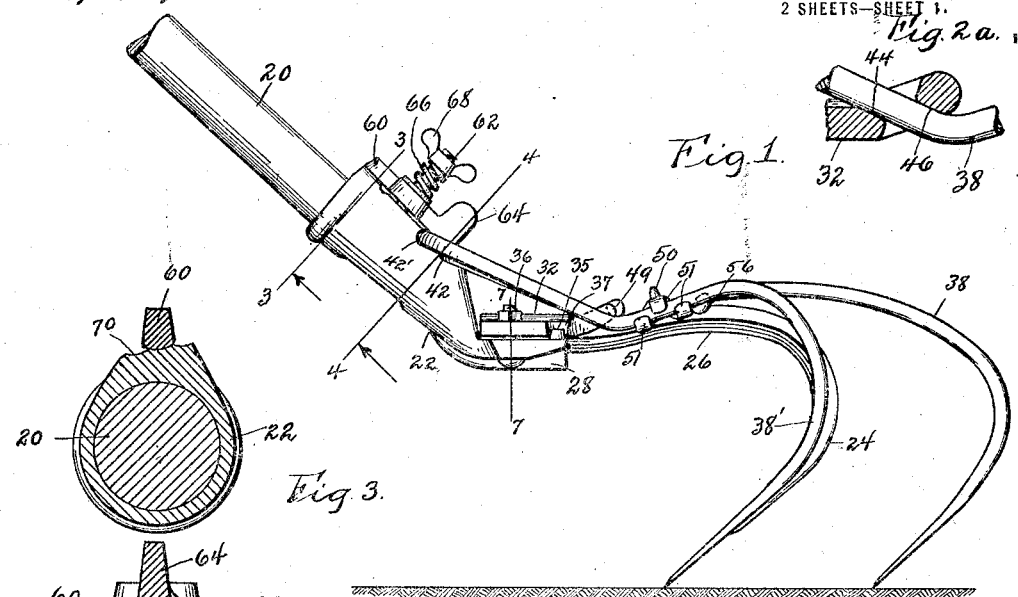
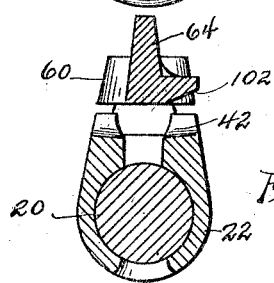
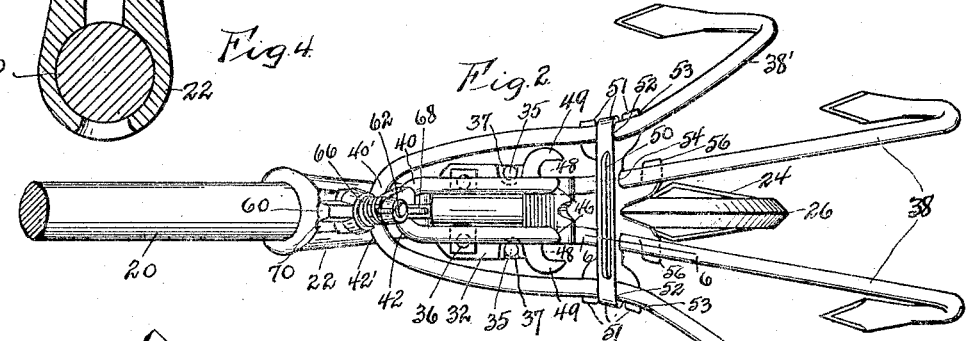
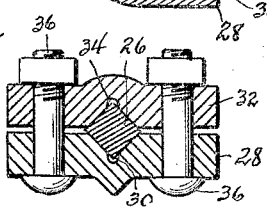
WITNESS:
R. Hamilton
INVENTOR.
A. S. Beymer,
BY Chas. W. Gerard
ATTORNEY

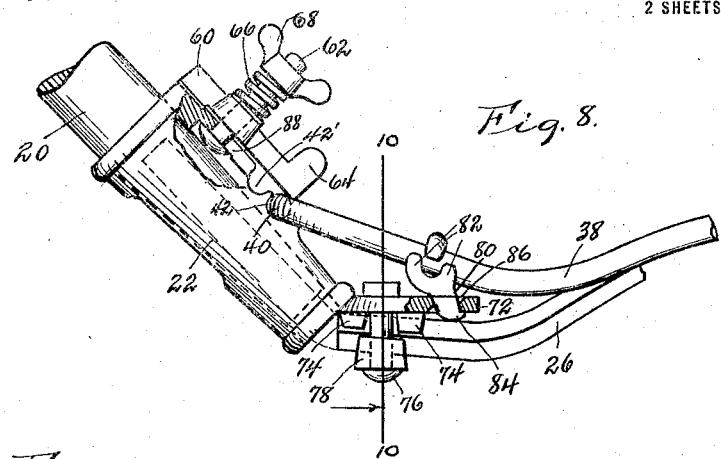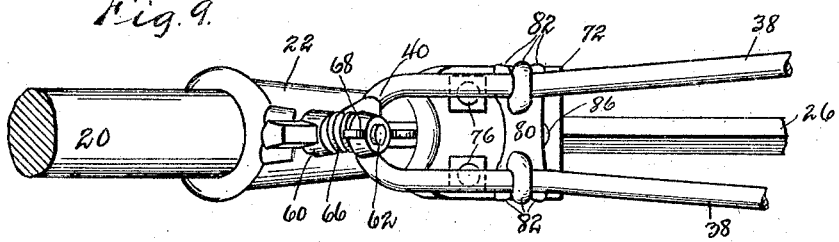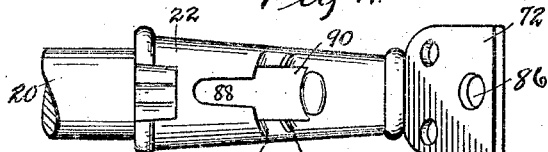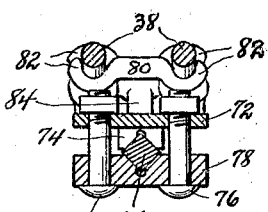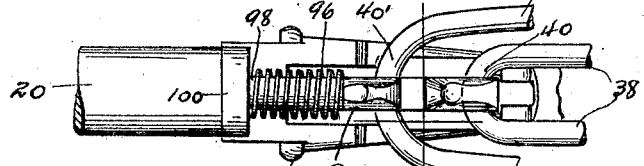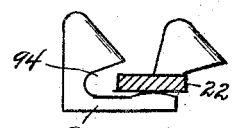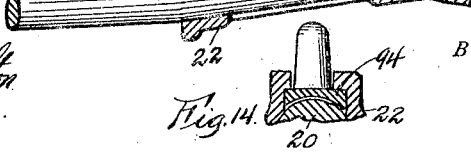

UNITED STATES PATENT OFFICE.

ADELBERT S. BEYMER, OF KANSAS CITY, MISSOURI.

CULTIVATOR.

1,276,017.

Specification of Letters Patent.

Patented Aug. 20, 1918.

Application filed September 4, 1917. Serial No. 189,450.

*To all whom it may concern:*

Be it known that I, ADELBERT S. BEYMER, a citizen of the United States, residing at Kansas City, in the county of Jackson and State of Missouri, have invented certain new and useful Improvements in Cultivators, of which the following is a specification.

The present invention relates to improvements in cultivating implements, and aims particularly to provide a cultivator construction in which the cultivating members or tines may be readily and quickly attached or removed without the loosening of bolts or the like, and without requiring the use of any tools.

To this end the invention provides an arrangement and construction whereby the cultivator may either be employed with a single cultivating member for certain operations, or may have additional cultivating members quickly applied thereto for other operations for which a plurality of cultivating members of varying number may be required.

It is also an object to provide an implement comprising a central removable cultivating blade or tine which may or may not be used in conjunction with other removable tines varying in number, which other tines are constructed and arranged for quick and convenient application or removal by virtue of a simple latch construction adapted to retain said tines in place while in use.

It is also sought to devise a simple construction of the character described, and which will be strong and durable as well as economical and inexpensive to manufacture. Minor objects will appear in the course of the detailed description.

The invention will now be described with reference to the accompanying drawings illustrating the preferred form of construction with certain modifications which the same may assume in practice, after which those features deemed to be novel will be set forth and defined in the appended claims.

In the drawings—

Figure 1 is a side elevation of a cultivating implement embodying the present improvements, the handle being shown as partly broken away;

Fig. 2 is a plan view of the same;

Fig. 2ª is a sectional detail of a bearing-groove construction for one of the cultivating tines;

Figs. 3 and 4 are sections on the lines 3—3 and 4—4, respectively, of Fig. 1 (the cultivating members not being shown in Fig. 4);

Fig. 5 is a central longitudinal sectional view of the device partly broken away;

Fig. 6 is an enlarged section on the line 6—6 of Fig. 2;

Fig. 7 is an enlarged transverse section taken on the line 7—7 of Fig. 1;

Fig. 8 is a side elevation of a slightly modified construction, with the tines partly broken away;

Fig. 9 is a plan view of the same;

Fig. 10 is a transverse section, taken on the line 10—10 of Fig. 8;

Fig. 11 is a plan view of the shank member with the other parts removed;

Fig. 12 is a broken plan view of a further modified construction;

Fig. 13 is a central longitudinal sectional view of the same;

Fig. 14 is an enlarged detail section of the latch portion taken on the line 14—14 of Fig. 12; and Fig. 15 is an enlarged sectional detail of the latch showing its rocking engagement with the shank member.

Referring to the drawings in detail, and more particularly to Figs. 1 to 7 thereof, the invention is illustrated as applied to and carried by a handle 20 (only a portion of which is shown), though it is obvious that the improvements are equally well adapted to be applied to the beam or equivalent portion of a wheeled cultivator frame. Secured to the lower end of this handle 20 is a shank member 22, formed as a ferrule or socket-piece, to which are secured the cultivating members. As shown by the drawings, one of these cultivating members comprises a narrow cultivating blade 24 having a point and side cutting edges, and provided with a curved and rearwardly extending shank 26 having its rear end clamped to the shank member 22, the arrangement preferably being such that the axis of the shank member will intersect the center or axis of the working resistance of the blade 24, in the manner described in Letters Patent #1185581 issued to me on May 30, 1016. The shank member 22 is formed with the extension 28 having a V-shaped groove 30 for fitting the squared end of the shank 26 which is clamped therein by means of a plate 32 formed with a similarly shaped groove 34 for fitting said shank

26, the clamping parts being secured in clamped relation by means of bolts 36. The extension is also provided with pins 35 fitting recesses 37 in the plate 32 for coöperating with said bolts in holding the plate in proper position.

As thus constructed, i. e., without additional cultivating members, the implement is adapted to be operated in the manner of the mulching hoe of the patent just referred to, for going in between close-growing plants, penetrating hard soil, opening furrows for seed drill, and the like, and having all the advantages fully set forth in said patent. For a wider range of tillage, and greater capacity for surface cultivation,— as for cultivating between the rows of plants, it is desirable to apply a number of additional cultivating members, and I make provision for doing this easily, quickly and conveniently, and converting the implement into a multiple-pronged cultivator, which may or may not include the central member 24, as will now be explained.

The additional cultivating members are preferably provided in the form of pairs of tines 38, 38', etc., of the same general contour as the member 24 and its shank 26, and having their rear ends integrally connected by transverse portions 40, 40', adapted to rest in grooves 42, 42', provided in the upper side of the shank member 22. For providing supporting means at the forward end of the shank member 22 for the intermediate portions of the first pair of auxiliary tines 38, said shank member is equipped with pairs of double grooved bearings which are preferably formed (for convenience of manufacture) on the clamping plate 32 carried by said shank member (see Fig. 2ᵃ). One of the grooved bearings 44 of each pair embraces the corresponding tine 38 from below, while the other bearing 46 embraces said tine from above and in advance of the bearing 44. A lateral opening or passage 48 permits the insertion of the corresponding tine between said grooves 44 and 46, and a guard member 50 projects from the plate 32 outwardly and forwardly across each passage 48 in position to protect the plants from being caught in said grooves in case the auxiliary tines are not being used.

For providing supporting means for the intermediate portions of the second pair of auxiliary tines 38', the same are equipped with a yoke member 50 overlying the cultivating member 24 and having its opposite ends formed with the curved fingers 51 providing spaced upper and lower grooved bearings 52 and 53 respectively for the opposite sides of the corresponding tines. Intermediate its ends the yoke member 50 is formed with grooved bearings 54 (see Fig. 6) resting upon the tops of the tines 38, and with fingers 56 extending downward and beneath said tines 38 and providing the grooved bearings 58 therefor in advance of the bearings 54.

With the foregoing construction it will be apparent that any pressure upward on the free ends of the auxiliary tines 38, 38', will be transmitted upward against the grooved bearings 46 and 52, and thereby result in a corresponding downward pressure of the transverse portions 40, 40', within their grooves 42, 42'. Thus the working strokes of the implement tend automatically to hold the cultivating members securely in their proper position already described, and there is only needed a sufficient latching action for retaining said members in said position during the intervals when the implement is lifted between strokes. For this purpose a manually operated latch member 60 is pivoted loosely upon a bolt 62 projecting from the upper side of the shank member 22. One end of the latch 60 is provided with a thumb piece 64 and is adapted to swing over the grooves 42, 42', into latching engagement with the transverse portions 40, 40' (see Fig. 5) of the cultivating members. The latch is adapted to be held yieldingly in this engagement by means of a spring 66 coiled about the bolt 62, the action of which spring may be regulated, or entirely overcome if desired, by means of a thumb nut 68. The shank member 22 is formed with a stepped cam surface 70 (see Fig. 3) for engagement with the opposite end of the latch member 60, which has a slightly curved portion fitting the several curved portions of said cam surface; by this means the latch is held firmly in its latching position and adapted to be accommodated to variations in the relative positions of the transverse portions 40, 40', due to wear or otherwise.

Referring now to Figs. 8 to 11 of the drawings, these views illustrate a modified form with one pair of auxiliary cultivating tines mounted in position. In this construction, the central cultivating member 24 may have its shank portion 26 embraced within the shank member 22 as illustrated by the dotted lines in Fig. 8, or it may be mounted detachably as shown by the full lines in said figure. The member 22 is provided with the extension 72 formed with a pair of depending recessed lugs 74 within which to seat the shank 26. The extension 72 is also provided with bolts 76 supporting a recessed clamping bar 78 (see Fig. 10) for engagement with the opposite side of the shank 26 from the lugs 74, whereby said shank is held securely in the position shown. In the present case, the first set of auxiliary cultivating tines 38 are provided with a yoke member 80 having the fingers 82 providing spaced upper and lower grooved bearings in all respects similar to those provided by the fingers 51 already described. Intermediate its ends the said yoke member 80 is formed with a retaining finger 84 projecting downwardly and forwardly in position adapting the same to be inserted hook-fashion through an opening 86 in the extension 72. When mounted in this manner the transverse portion 40 of the cultivating tines is clamped in the groove 42 of the shank member by the latching means as in the preferred form of construction, and the arrangement is such that the operative pressure on the tines effects a downward pressure in said groove 42 as before, while the finger 84 exerts a downward and rearward pressure at the upper margin of the opening 86 and an upward and forward pressure at the lower margin of said opening, so that the construction is in a measure self-locking, with the operative movements of the implement tending naturally to seat the parts more firmly and securely together in their attached relation.

In this modification it will also be noted that provision is made for convenient insertion of the bolt 62 by the way of an open-ended slot 88 into which the shank of the bolt may be inserted after its head has been let down through the enlarged opening 90 located between the grooves 42, 42', at the forward end of the slot 88.

In Figs. 12 to 15 is shown a further modification, being a somewhat different construction of the latching means and comprising a sliding latch member provided with the body portion 92 mounted slidingly within the shank member 22 and having the latching recesses 94 for receiving the transverse portions 40, 40', of the cultivating members. The latch member is normally actuated into latching position by means of a coil spring 96 carried by the stem 98 of the latch, which stem projects within a keeper 100, the latter being located in position for engagement with one end of said spring. Referring to Figs. 13 and 15, it will be noted that the body portion 92 of the latch member is formed with a curved surface for contact with the adjacent retaining wall of the shank member 22, which is for the purpose of permitting the latch to have a certain amount of longitudinal rocking movement whereby the latch member may adjust itself automatically to different relative positions of the transverse connecting portions 40, 40' of the cultivating members, since these connecting portions will of course seldom be at exactly the same level. This function is analogous to that provided for in the loose mounting of the latch in the preferred form for enabling the same to have a longitudinal tipping movement whereby it may be clamped in various positions along the cam surface 70. Furthermore, the upper margins of the recesses 94 are inclined, as clearly shown in Figs. 13 and 15, which construction affords a cam action adapted to depress the transverse connecting portions 40 and 40' into their grooves as well as retain them locked in said grooves at whatever points said inclined margins may be engaged. Referring to the preferred form, a similar function of depressing said transverse portions 40 and 40' into their grooves is performed by the action of the cam surface 102 which is formed on that portion of the latch which swings over the grooves 42 and 42'.

It will thus be seen that a simple, practical and efficient arrangement and construction have been devised for carrying out the desired objects of the invention. The central cultivating blade 24 may be used alone, without the other members 38 or 38', in all respects the same as explained in my prior patent above referred to, and when additional cultivating tines are needed, these may be readily and quickly applied into working position and as quickly and conveniently removed when their use is no longer required. Hence, a single tine, two-tine, three-tine, four-tine or five-tine implement is readily obtained by the different arrangements of the cultivating members, and of course as many of such pairs of tines may be mounted in the manner described as the particular needs of the user may dictate. These changes are quickly made without the loosening of any bolts or the like and are effected manually without the operation of any tools of any sort which has heretofore rendered such changes a more or less disagreeable and troublesome task, especially since the parts become caked with rust.

While the construction described represents what now appears to be the simplest and most efficient for fulfilling the proposed objects of the invention, the right is reserved to such formal changes and modifications as may fairly fall within the scope of the appended claims.

What I claim is:

1. A cultivator construction comprising a shank member, a removable cultivating member formed with a tine portion, and means for detachably securing said cultivating member in fixed relation to said shank member, said means including a latch provided with a loose operative connection with said shank member.

2. A cultivator construction comprising a shank member, a removable cultivating member formed with a tine portion, and means for detachably securing said cultivating member with its tine portion in fixed relation to said shank member, said means including a latch provided with a yielding operative connection with said shank member.

3. A cultivator construction comprising a shank member, a removable cultivating member formed with a plurality of tine portions, means for removably supporting said cultivating member with its tine portions in fixed operative position, and means for detachably securing said cultivating member to said shank member including a latch having a loose operative connection with said shank member.

4. A cultivator construction comprising a shank member, a removable cultivating member formed with a cultivating tine, said shank member being provided with upper and lower integrally connected and grooved bearings adapted to embrace opposite sides of said tine, said bearings being arranged one in advance of the other to permit insertion of the tine between them, and means for detachably locking said cultivating member with its tine in place between said bearings.

5. A cultivator construction comprising a shank member, a plurality of cultivating tines rigidly connected to form a removable set of tines adapted to be bodily applied to or detached from said shank member, and means for detachably securing said set of tines to said shank member with the tines extending into working position on opposite sides of the middle longitudinal line of the cultivator, said means including a latch element having a loose operative connection with said shank member.

6. A cultivator construction comprising a shank member, a removable cultivating member formed with a cultivating tine, said shank member being provided with integrally connected and relatively immovable upper and lower bearings adapted to embrace opposite sides of said tine, and arranged to permit the insertion of said tine between said bearings, and means for detachably securing said cultivating member in position with its tine extending between said bearings.

7. A cultivator construction, comprising a shank member, a cultivating member connected to said shank member, additional removable cultivating means comprising a plurality of cultivating tines extending in position on each side of said cultivating member, and means for detachably mounting said cultivating means in operative relation to said cultivating member including a pair of double bearing grooves for each of said tines arranged on opposite sides of each tine with one groove in advance of the other, each pair of bearing grooves having a lateral opening between them to permit the tines to be inserted between said grooves.

8. A cultivator construction comprising a shank member formed with integrally connected upper and lower bearings, a pair of removable integrally connected cultivating tines, and means for detachably securing said pair of cultivating tines to said shank member with said tines positioned within said bearings.

9. A cultivator construction, comprising a shank member, removable cultivating means comprising a plurality of cultivating tines, grooved bearings arranged for removably receiving the intermediate portions and also the rear end portions of said cultivating means, and pivoted latch means for detachably latching said rear end portions in their bearings with said tines extending through the remaining grooved bearings into working position.

10. A cultivator construction, comprising a shank member, removable cultivating means comprising a plurality of cultivating tines, a pair of upper and lower grooved bearings for each of said tines arranged on opposite sides of each tine with the upper bearing in advance of the other, said shank member being formed with upwardly facing bearing grooves for the rear end portions of said cultivating means, and means for latching said end portions in their grooves with said tines extending through said grooved bearings into working position, whereby upward pressure on the free ends of said tines will effect downward pressure at the rear end portions thereof.

11. A cultivator construction comprising a shank member, an inner cultivating member connected to said shank member, an outer cultivating member comprising a plurality of tines rigidly connected to form a removable set of tines adapted to be bodily applied to or detached from said shank member, and means for detachably securing said outer cultivating member to the shank member with its tines extending into working position on opposite sides of said inner cultivating member.

12. A cultivator construction, comprising a shank member, cultivating means comprising a plurality of cultivating tines, means for removably supporting the intermediate portions of said tines, and means for yieldingly securing the rear end portions of said cultivating means to said shank member.

13. A cultivator construction, comprising a shank member, cultivating means comprising a plurality of cultivating tines, means for removably supporting the intermediate portions of said tines, means for securing the rear end portions of said cultivating means to said shank member including a member having a spring for holding it in yielding engagement with said rear end portions, and means for adjusting the action of said spring.

14. A cultivator construction, comprising a shank member, cultivating means comprising a plurality of cultivating tines, means for removably supporting the intermediate portions of said tines, and a latch member loosely pivoted intermediate its ends to said shank member with one end of said latch member in position to engage and retain the rear end portions of said cultivating means, said shank member being formed with a cam surface in position to coöperate with the other end of said latch member to hold the latter in firmly latched position.

15. A cultivator construction, comprising a shank member, a cultivating member connected to said shank member, additional removable cultivating means comprising a plurality of cultivating tines extending in position on each side of said cultivating member, means for detachably mounting said cultivating means in operative relation to said cultivating member including a pair of double bearing-grooves for each of said tines located on opposite sides of each tine with one groove in advance of the other, each pair of said grooves having a lateral opening between them to permit the insertion of the tines between said grooves, and a guard member projecting outwardly and forwardly across each of said lateral openings.

16. A cultivator construction, comprising a shank member, a central cultivating member projecting forwardly and having the axis of the working resistance of its operating portion intersected by the axis of said shank member, additional removable cultivating means comprising a plurality of cultivating tines projecting forward at opposite sides of said central cultivating member, and manually operated latch means for detachably securing said removable cultivating means in fixed working position.

17. A cultivator construction comprising a shank member, a removable cultivating member comprising a plurality of cultivating tines, said shank member being equipped with supporting means comprising relatively fixed elements adapted for removable supporting engagement with said tines while maintaining said elements in their normal relatively fixed position, and latch means operable to engage said cultivating member and retain the same with its tines in engagement with said supporting means.

18. A cultivator construction comprising, in combination, a shank member, removable cultivating means comprising a plurality of cultivating tines, means forming a support for the intermediate portions of said tines, and a latch member for detachably securing the rear portions of said cultivating means to said shank member, said latch member being mounted for rocking movement adapted to permit said latch member to accommodate itself to relatively different positions of said rear portions of the cultivating means.

19. A cultivator construction comprising, in combination, a shank member, removable cultivating means comprising a plurality of cultivating tines, means forming a support for the intermediate portions of said tines, said shank member being formed with grooves for receiving the rear end portions of said cultivating means, and a movable latch member for latching said end portions within said grooves, said latch member being provided with an inclined surface operating with a cam action to depress said end portions into the grooves.

20. A cultivator construction comprising a shank member, an inner cultivating member removably connected to said shank member, an outer cultivating member comprising a plurality of tines rigidly connected to form a removable set of tines adapted to be bodily applied to or detached from said shank member, and means for detachably securing said inner and outer cultivating members to said shank member with the tines of said outer member extending into working position on opposite sides of said inner member, said means permitting the bodily attachment or removal of the outer member while leaving the inner member in its normal working position.

21. A cultivator construction comprising a shank member, a removable cultivating member comprising a plurality of cultivating tines, said shank member being provided with a pair of integrally connected and relatively immovable upper and lower bearings adapted to embrace opposite sides of each of said tines and each pair of bearings having a lateral opening for permitting the insertion of the tines between the bearings, and means for detachably securing said cultivating member in position with its tines extending between said bearings.

22. A cultivator construction comprising a shank member, a plurality of sets of removable cultivating members, each set comprising a plurality of cultivating tines, said shank member being provided with a pair of integrally connected upper and lower bearings adapted to embrace opposite sides of each of said tines, each pair of bearings being arranged with one of the bearings in advance of the other to permit insertion of the tine between them, means for detachably interlocking said sets of cultivating members, and means for detachably securing said sets of cultivating members in position with their tines extending between said bearings.

23. A cultivator construction comprising a shank member, a central cultivating member carried by said shank member, a plurality of sets of removable cultivating members, each set comprising an even number of integrally connected tines, means for detachably interlocking said sets of cultivating members, and means for detachably connecting said sets of cultivating members to said shank member with an equal number of said tines extending in position on opposite sides of said central cultivating member.

24. A cultivator construction comprising, in combination, a shank member, a plurality of cultivating tines, and means for detachably and yieldingly securing said plurality of cultivating tines to said shank member.

25. A cultivator construction comprising, in combination, a shank member, a plurality of cultivating tines, and means for detachably connecting said plurality of cultivating tines to said shank member, said connecting means including a movable member and a spring acting to hold said movable member in yielding engagement with both said shank member and said plurality of cultivating tines.

26. A cultivator construction comprising a shank member, a plurality of sets of removable cultivating tines, means for detachably interlocking said sets of tines together in relatively fixed relation to each other, and means for removably securing said sets of tines to said shank member in working position, said securing means including a latch having a loose operative connection with said shank member.

27. A cultivator construction comprising a shank member, a plurality of removable cultivating tines, and means having a yielding operative connection with said shank member for detachably securing said tines to said shank member.

28. A cultivator construction comprising a shank member, a center cultivating member, a pair of removable cultivating tines, and means having a loose operative connection with said shank member for detachably securing said tines in working position on opposite sides of said center cultivating member.

In witness whereof I affix my signature.

ADELBERT S. BEYMER.

Copies of this patent may be obtained for five cents each, by addressing the "Commissioner of Patents, Washington, D. C."